United States Patent [19]

Tanaka et al.

[11] Patent Number: 5,443,130
[45] Date of Patent: Aug. 22, 1995

[54] ELECTRIC MOTOR VEHICLE DRIVE SYSTEM HAVING DIFFERENTIAL GEAR DEVICE WHOSE SPLINED OUTPUT ELEMENTS ARE ABUTTABLE ON STOP MEMBER TO RECEIVE THRUST FORCES APPLIED TO VEHICLE WHEEL DRIVE MEMBERS

[75] Inventors: Koichi Tanaka, Mishima; Kinya Yoshii, Toyota; Eiji Ichioka, Toyota; Takeharu Koide, Toyota; Kojiro Kuramochi, Numazu, all of Japan

[73] Assignee: Toyota Jidosha Kabushiki Kaisha, Toyota, Japan

[21] Appl. No.: 117,843

[22] Filed: Sep. 7, 1993

[30] Foreign Application Priority Data

Sep. 11, 1992 [JP] Japan ................................. 4-269594

[51] Int. Cl.⁶ ................................................ B60K 1/00
[52] U.S. Cl. ................................. 180/65.6; 475/174
[58] Field of Search ................ 180/65.1, 65.6, 375, 180/65.7, 385, 383; 475/174, 178, 179; 74/413

[56] References Cited

U.S. PATENT DOCUMENTS

| | | |
|---|---|---|
| 1,619,051 | 3/1927 | Asprooth et al. |
| 2,795,969 | 6/1957 | McCarthy . |
| 3,136,379 | 6/1964 | Louster .................... 180/65.6 |
| 3,283,843 | 11/1966 | Runyan . |
| 3,937,293 | 2/1976 | Sasdorf .................... 180/65.6 |
| 4,283,968 | 8/1981 | Kalns . |
| 4,418,777 | 12/1983 | Stockton .................. 180/65.5 |
| 5,116,291 | 5/1992 | Togosumi et al. ........ 180/65.6 |

FOREIGN PATENT DOCUMENTS

| | | |
|---|---|---|
| 0442437 | 8/1991 | European Pat. Off. . |
| 2520079 | 7/1983 | France . |
| 50-206430 | 8/1975 | Japan . |

*Primary Examiner*—Richard M. Camby
*Attorney, Agent, or Firm*—Kenyon & Kenyon

[57] ABSTRACT

A drive system for an electric motor vehicle, including a differential gear device including an input element connected to an electric motor and two output elements from which the motor power received by the input element is distributed to a first wheel drive member and an intermediate shaft which extends through a hollow output shaft of the motor and is connected to a second wheel drive member, wherein the first drive member and intermediate shaft have splined end portions which engage splined center bores of the two output elements of the differential gear device, and a stop member is provided on one of the two output members, so as to protrude into at least one of the first and second center bores, such that the end faces of the end portions of the first drive member and intermediate shafts are abuttable on the opposite ends of the stop member, whereby a transverse thrust force applied to the drive members is received by the stop member.

17 Claims, 8 Drawing Sheets

ELECTRIC MOTOR VEHICLE DRIVE SYSTEM HAVING DIFFERENTIAL GEAR DEVICE WHOSE SPLINED OUTPUT ELEMENTS ARE ABUTTABLE ON STOP MEMBER TO RECEIVE THRUST FORCES APPLIED TO VEHICLE WHEEL DRIVE MEMBERS

BACKGROUND OF THE INVENTION

1. Field of the Invention

The present invention relates to a drive system for an electric motor vehicle, and more particularly to a support structure associated with drive members connected to drive wheels, which structure is adapted to effectively receive thrust forces applied to the drive members through the drive wheels in the transverse direction of the vehicle.

2. Discussion of the Related Art

For an electric motor vehicle, there is used a drive system of the type which includes (a) a housing mounted on a chassis of the vehicle, (b) an electric motor disposed in this housing and having a hollow output shaft whose axis is parallel to the transverse direction of the vehicle, (c) a first and a second drive member which are supported by the above-indicated housing rotatably about respective axes coaxial with the output shaft of the motor and which are operatively connected to a pair of drive wheels, respectively, (d) an intermediate shaft disposed coaxially with the output shaft of the motor so as to extend through a center bore of the output shaft, and connected at an axial end thereof to the second drive member for rotation therewith, (e) a differential gear device of planetary gear type disposed in the above-indicated housing coaxially and in series with the output shaft of the motor, the differential gear device including four elements consisting of a sun gear, a ring gear, a carrier and a planetary gear, one of which serves as an input element that receives power transmitted from the motor, and the others of which include two output elements through which the power received by the input member are distributed to the first drive member and the intermediate shaft, and (f) a plurality of thrust bearings for positioning the four elements of the differential gear device so as to inhibit movements of these elements in an axial direction of the output shaft of the motor. An example of such drive system for an electric motor vehicle is disclosed in Japanese Patent Application No. 4-160235 filed in the name of the assignee of the present application, which had not been laid open at the time the present invention was made. FIG. 9 of the present application is a cross sectional view of the drive system as disclosed in the above-identified application.

In the electric motor vehicle drive system disclosed in FIG. 9, the power produced by an electric motor 200 is first transmitted to a speed reducing device of planetary gear type 204 through an output shaft 202 of the motor. The power whose torque has been amplified by the speed reducing device 204 at a predetermined speed reduction ratio of the device 204 is then received by a differential gear device 206 of planetary gear type, which has a ring gear 208, a planetary gear 210, a carrier 212 and a sung gear 214. The power received by the ring gear 208 is distributed to the carrier 212 and sun gear 214 through the planetary gear 210, so that a portion of the received power is transmitted from the carrier 212 to a left axle and a left drive wheel (not shown) through a first drive member 216L connected to the carrier 212, while the rest of the power is transmitted from the sun gear 214 to a right axle and a right drive wheel (not shown) through an intermediate shaft 218 and a second drive member 216R. The intermediate shaft 218 is connected at one axis end thereof to the sun gear 214 and extends through the output shaft 202 of the electric motor 200. The other end of the intermediate shaft 218 is connected to the right drive member 216R.

In the drive system of FIG. 9, a thrust force which is applied to the first or second drive member 216L, 216R in the transverse direction and inwardly of the vehicle is received by a housing of the drive system. Such transverse thrust force acts on the first or second drive member 216L, 216R due to an inertial force during turning of the vehicle along a curve or corner, or upon collision of the vehicle with a sidewalk or pavement guard or a guard rail due to slipping of the drive wheels on a road surface with a low coefficient of friction. When a transverse thrust force is applied to the first or left drive member 216L, the thrust force is transmitted to a housing 238 through a thrust bearing 220, the above-indicated sun gear 214, a thrust bearing 222, a second-stage carrier 224 of the speed reducing device 204, a thrust bearing 226, a second-stage sun gear 228 and a first-stage carrier 230 of the device 204, a thrust bearing 232, a first-stage sun gear 234 of the device 204 and a thrust bearing 236. When a transverse thrust force is applied to the second or right drive member 216R, the thrust force is transmitted to a housing 244 through a flange 240 formed to extend radially outwardly of the drive member 216R, and a thrust bearing 242.

The thrust bearing 242 disposed adjacent to the radial outward flange 240 of the second drive member 216R has a comparatively large diameter, and causes a considerably large amount of power loss due to friction when a transverse thrust force input to the second drive member 216R is transmitted to the housing 244 through the flange 240 and thrust bearing 242. Thus, the power transmission efficiency of the drive system is deteriorated. The drive system also suffers from a drawback that the first drive member 216L cannot be removed from the differential gear device 206 for a repairing purpose with the vehicle in a loaded condition, since a radial outward flange 246 formed on the first drive member 216L to support the carrier pin is located within the housing 238 and extends in the radially outward direction so that the housing 238 disturbs the removal of the first drive member 216L.

The drive system of an electric motor vehicle may use a differential gear device of bevel gear type which has been widely used for a motor vehicle with a gasoline engine or other internal combustion engine. This type of differential gear device, which is shown in FIG. 10, is adapted such that a transverse thrust force applied to a left or right drive member 250L, 250R is transmitted to and received by a housing 260 thorough a differential pinion shaft 252, a differential casing 254 and a left or right tapered roller bearing 256, 258. Thus, the drive members 250L, 250R do not have a flange for transmitting the transverse thrust force. If such differential gear device is used in a drive system for an electric motor vehicle, it is necessary to replace the drive members 250L, 250R with exclusive drive members having flanges and provide respective thrust bearings to transmit the received thrust forces. Accordingly, the cost of manufacture of the drive system is unfavorably increased with an increased number of components.

SUMMARY OF THE INVENTION

The present invention was developed in the light of the prior art situation described above. It is therefore an object of the present invention to provide a drive system for an electric motor vehicle, wherein the drive members do not require flanges as provided in the prior art to transmit received transverse thrust forces to the housing.

The above object may be accomplished according to the principle of the present invention to provide a drive system for an electric motor vehicle, having (a) a housing structure mounted on a chassis of the vehicle, (b) an electric motor disposed in the housing structure and having a hollow output shaft whose axis is parallel to a transverse direction of the vehicle, (c) a first and a second drive member which are supported by the housing structure, rotatably about respective axes coaxial with the output shaft, the drive members being operatively connected to a first and a second drive wheel, respectively, (d) an intermediate shaft disposed coaxially with the output shaft so as to extend through a center bore of the output shaft, and connected at one axial end thereof to the second drive member for rotation therewith, (e) a differential gear device of planetary gear type disposed in the housing structure coaxially and in series with the output shaft, the differential gear device including a sun gear, a ring gear, a carrier and a planetary gear, one of which serves as an input element that receives power transmitted from the electric motor, and the others of which include two output elements through which the power received by the input member are distributed to the first drive member and the intermediate shaft, and (f) a plurality of thrust bearings for positioning the elements of the differential gear device so as to inhibit movements of the elements in an axial direction of the output shaft, wherein the first drive member includes a first end portion having a splined outer circumferential surface remote from the first drive wheel, while the intermediate shaft includes a second end portion having a splined outer circumferential surface remote from the second drive member, the two output elements of the differential gear device respectively having a first center bore and a second center bore defined by respective splined inner surfaces which engage the splined outer circumferential surfaces of the first and second end portions, respectively, and wherein a stop member is provided on one of the two output elements, so as to protrude into at least one of the first and second center bores, such that opposed end faces of the first and second end portions are abuttable on opposite ends of the stop member, whereby a transverse thrust force applied to the first and second drive members in transversely inward direction of the vehicle is received by the stop member.

In the present electric motor vehicle drive system, the two output elements of the differential gear device have the respective first and second splined center bores, while the first drive member and the intermediate shaft have the respective first and second splined end portions which engage the first and second center bores of the two output elements. One of the two output elements is provided with a stop member which protrudes into at least one of the first and second center bores such that the opposed end faces of the first and second end portions of the first drive member and the intermediate shaft are abuttable on the opposite ends of the stop member, so that a transverse thrust force applied to the first and second drive members in the transversely inward direction of the vehicle is transmitted to the stop member. The thrust force transmitted to the stop member is transmitted to and received by the housing structure through the elements of the differential gear device and the thrust bearings which position the elements of the differential gear device.

As described above, the present drive system for an electric motor vehicle is constructed such that the transverse thrust force applied to the first and second drive members is transmitted through the stop member to the differential gear device. Thus, the drive system require neither flanges to be formed on the drive members, and nor thrust bearings having a large diameter, for transmitting the thrust force directly to the housing structure. The elimination of such flanges and large-diameter thrust bearings in the present drive system results in a considerably increase in the power transmitting efficiency of the drive system, and permits the removal of the first and second drive members from the differential gear device even when the vehicle is in a loaded condition. Further, non-flanged drive members as widely used for a conventional gasoline-engine vehicle can be used as the first and second drive members. The use of such non-flanged drive members and the elimination of large-diameter thrust bearings are conducive to a significant decrease in the cost of manufacture of the drive system.

The stop member may be constructed with a cylindrical portion interposed between the opposed end faces of the first and second end portion, and a radial flange portion which extends radially outwardly from the cylindrical portion and which is fixed to the above-indicated one of the two output members.

According to one form of the invention, the housing structure includes a side housing in which the differential gear device is disposed. If the stop member is fixed to the sun gear as the above-indicated one of the two output elements, the transverse thrust force applied to the second drive member is transmitted to and received by the side housing through the intermediate shaft, the stop member, the sun gear and a thrust bearing interposed between the side housing and the sun gear. If the stop member is fixed to the carrier, on the other hand, the transverse thrust force applied to the second drive member is transmitted to and received by the side housing through the following components: the intermediate shaft; the stop member; the carrier; a second thrust bearing interposed between the sun gear and the carrier; the sun gear; and a first thrust bearing interposed between the first side housing and the sun gear.

In the above form of the invention, the housing structure may further include an intermediate housing cooperating with the side housing to define an enclosure in which the differential gear device is accommodated, the intermediate shaft extending through the intermediate housing. If the stop member is fixed to the sun gear, the transverse thrust force applied to the first drive member being transmitted to and received by the intermediate housing through the stop mender and the sun gear, and through at least a thrust bearing disposed in contact with the intermediate housing. If the stop member is fixed to the carrier, on the other hand, the transverse thrust force applied to the first drive member is transmitted to and received by the intermediate housing through the stop member and the carrier, and through at least the thrust bearing disposed in contact with the intermediate housing.

BRIEF DESCRIPTION OF THE DRAWINGS

The above and optional objects, features and advantages of the present invention will become more apparent by reading the following detailed description of presently preferred embodiments of the invention, when considered in connection with the accompanying drawings, in which.

DETAILED DESCRIPTION OF THE PREFERRED EMBODIMENTS

Figure 1:
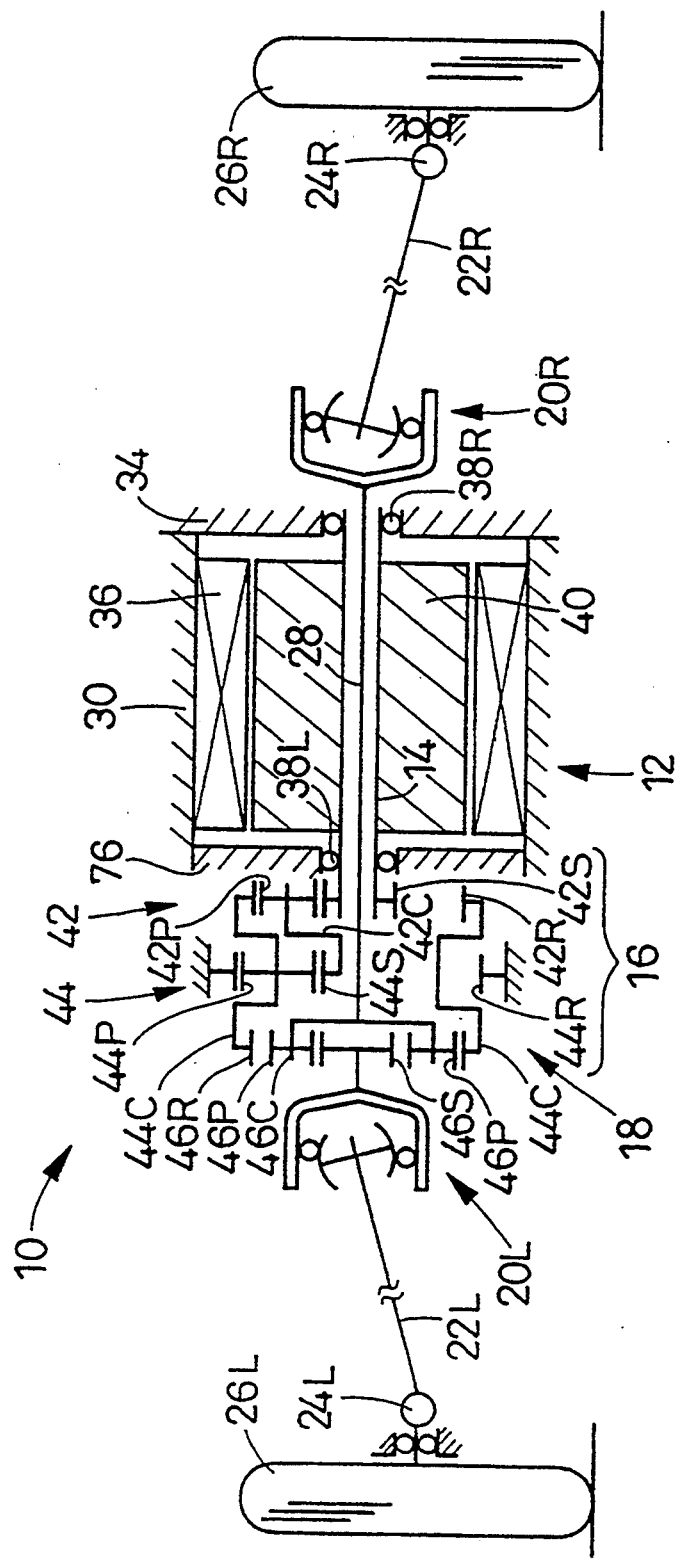
FIG. 1 is a schematic view showing in general a drive system for an electric motor vehicle, which is constructed according to one embodiment of the present invention.

Referring first to FIG. 1, a drive 10 system for an electric motor vehicle has an electric motor 12 with a hollow output shaft 14, a speed reducing device 16 of planetary gear type, and a differential gear device 18 of planetary gear type. Power transmitted from the output shaft 14 of the electric motor 12 is first received by the speed reducing device 16 so that the output speed of the device 16 is reduced with respect to the input speed. The output of the speed reducing device 16 is distributed by the differential gear device 18 to left and right drive drive lines.

Described in detail, a portion of the power received by the differential gear device 18 is delivered to a left drive wheel 26L through a first left constant-velocity joint 20L, a a left axle 22L and a second left constant-velocity joint 24L, while the remaining portion of the received power is delivered to a right drive wheel 26R through an intermediate shaft 28, a first right constant-velocity joint 20R, a right axle 22R and a second right constant-velocity joint 24R. The intermediate shaft 28 is disposed coaxially with the hollow output shaft 14, so as to extend through the center bore of the output shaft 14. The left and right drive wheels 26L, 26R are supported by a suitable suspension system as well known in the art. The speed reducing device 16, differential gear device 18 and first left and right constant-velocity joints 20L, 20R are disposed coaxially with the electric motor 12 and accommodated together with the motor 12 in a common housing structure supported by the chassis of the motor vehicle. Each of the first left and right constant-velocity joints 20L, 20R may be a double-offset type joint, for example, while each of the second constant-velocity joint 24L, 24R may be a Pzeppa type joint, for example. The left and right device wheels 26L, 26R may be the front wheels or the rear wheels of the vehicle.

The electric motor 12 may be an induction motor or a synchronous motor driven by an alternating current. As is apparent from the cross sectional view of FIG. 2, the motor 12 is accommodated within the housing structure which includes an cylindrical housing 30, and a first and a second side housing 32, 34 that fixedly engage the opposite open ends of the cylindrical housing 30. The electric motor 12 is position such that the output shaft 14 is parallel to the transverse direction (left and right direction) of the vehicle. The motor 12 includes a stator 36 with a coil winding secured to the inner circumferential surface of the cylindrical housing 30, and a rotor 40 which is fixedly mounted on the output shaft 14 such that the rotor 40 is disposed concentrically with and radially inwardly of the stator 36. The output shaft 14 is rotatably supported at its opposite end portions by a first intermediate housing 76 and the second side housing 34, respectively, through a pair of ball bearings 38L, 38R, whereby the rotor 40 is rotatably supported by the output shaft 14.

Referring back to FIG. 1, the speed reducing device 16 includes: a first planetary gear set having a first sun gear 42S, a first carrier 42C, a first planetary gear 42P rotatably supported by the first carrier 42C and meshing with the first sun gear 42S, and a first ring gear 42R meshing with the first planetary gear 42P; and a second planetary gear set having a second sun gear 44S connected to the first carrier 42C, a second planetary gear 44P meshing with the second sun gear 44S, a stationary second ring gear 44R meshing with the second planetary gear 44P, and a second carrier 44C rotatably supporting the second planetary gear 44P and connected to the first ring gear 42R. The speed reducing device 16 thus constructed is adapted such that the speed of a rotary motion of the electric motor 12 received by the first sun gear 42S is lowered at the second carrier 44C at a predetermined speed reduction ratio. The output of the speed reducing device 16 is delivered from the second carrier 44C to a third ring gear 46R of the differential gear device 18, which is disposed on the downstream side of the speed reducing device 16.

The differential gear device 18 is a double-pinion type planetary gear set having: a third sun gear 46S connected to the right end of the above-indicated first left constant-velocity joint 20L; the above-indicated third ring gear 46R connected to the second carrier 44C of the speed reducing device 16; two pairs of third planetary gears 46P, 46P which mesh with each other and also mesh with the third sun gear 46S and the third ring gear 46R, respectively; and a third carrier 46C which rotatably support the two pairs of third planetary gears 46P, 46P and which are connected to the left end of the intermediate shaft 28 described above. The thus constructed differential gear device 18 is adapted such that the rotary motion received at the third ring gear 46R is distributed to the third sun gear 46S operatively connected to the left drive wheel 26L, and to the third carrier 46C operatively connected to the right drive wheel 26R. It will be understood from the above explanation that the third ring gear 46R serves as an input element of the device 18, while the third sun gear 46S and the third carrier 46C serve as two output elements of the device 18.

Figure 2:
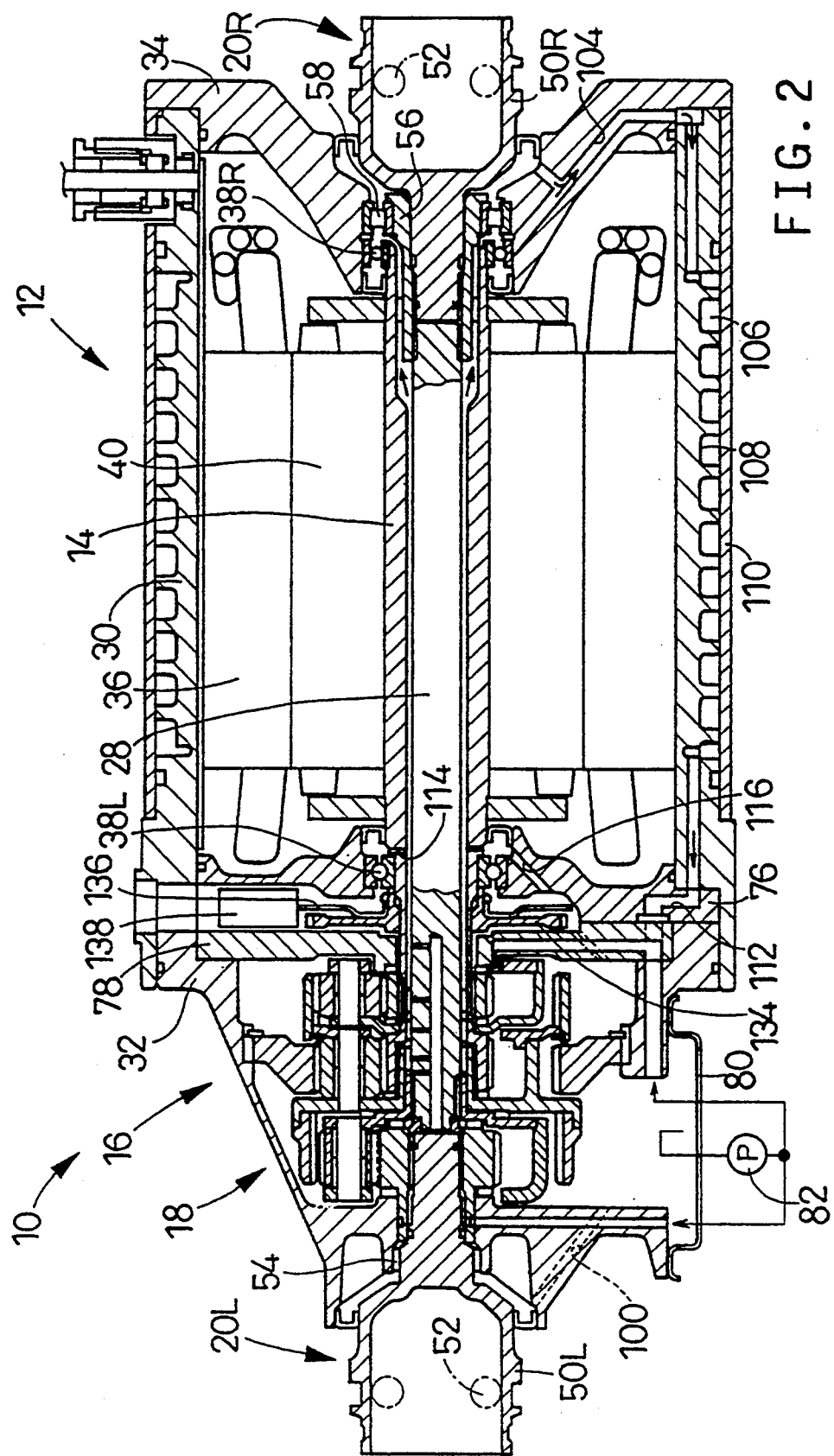
FIG. 2 is an elevational view in cross section of the drive system of FIG. 1.

As shown in FIG. 2, the first left and right constant-velocity joints 20L and 20R have respective outer races 50L, 50R of cylindrical construction each with an inner closed end. The left and right axles 22L and 22R have inner end portions splined to respective inner races. Between the outer race 50L, 50R of each constant-velocity joint 20L, 20R and the corresponding inner race, there is interposed an annular array of balls 52 retained by a suitable cage. The outer race 50L, 50R, inner race and balls 52 cooperate to constitute a constant-velocity universal joint in which the inner and outer races are rotated as a unit. The outer races 50L, 50R serve as first and second drive members operatively connected to the respective left and right drive wheels 26L, 26R, respectively.

The outer race 50L of the first left constant-velocity joint 20L has an inner shaft portion rotatably supported by a needle bearing 54 mounted on the first side housing 32, whereby the outer race 50L is supported rotatably about an axis coaxial with the output shaft 14 of the electric motor 12. On the other hand, the outer race 50R of the first right constant-velocity joint 20R has an inner shaft portion which is connected to a right end portion of the intermediate shaft 28, through a connecting sleeve 56 disposed coaxially with the output shaft 14, such that the right end portion of the shaft 28 and the shaft portion of the outer race 50L are splined to the connecting sleeve 56, so that the outer race 50R is rotated with the intermediate shaft 28. The connecting sleeve 56 is rotatably supported by a roller bearing 58 provided in a bore formed in a central portion of the second side housing 34, whereby the outer race 50R is supported by the second side housing 34, rotatably about an axis coaxially with the output shaft 14.

Figure 3:
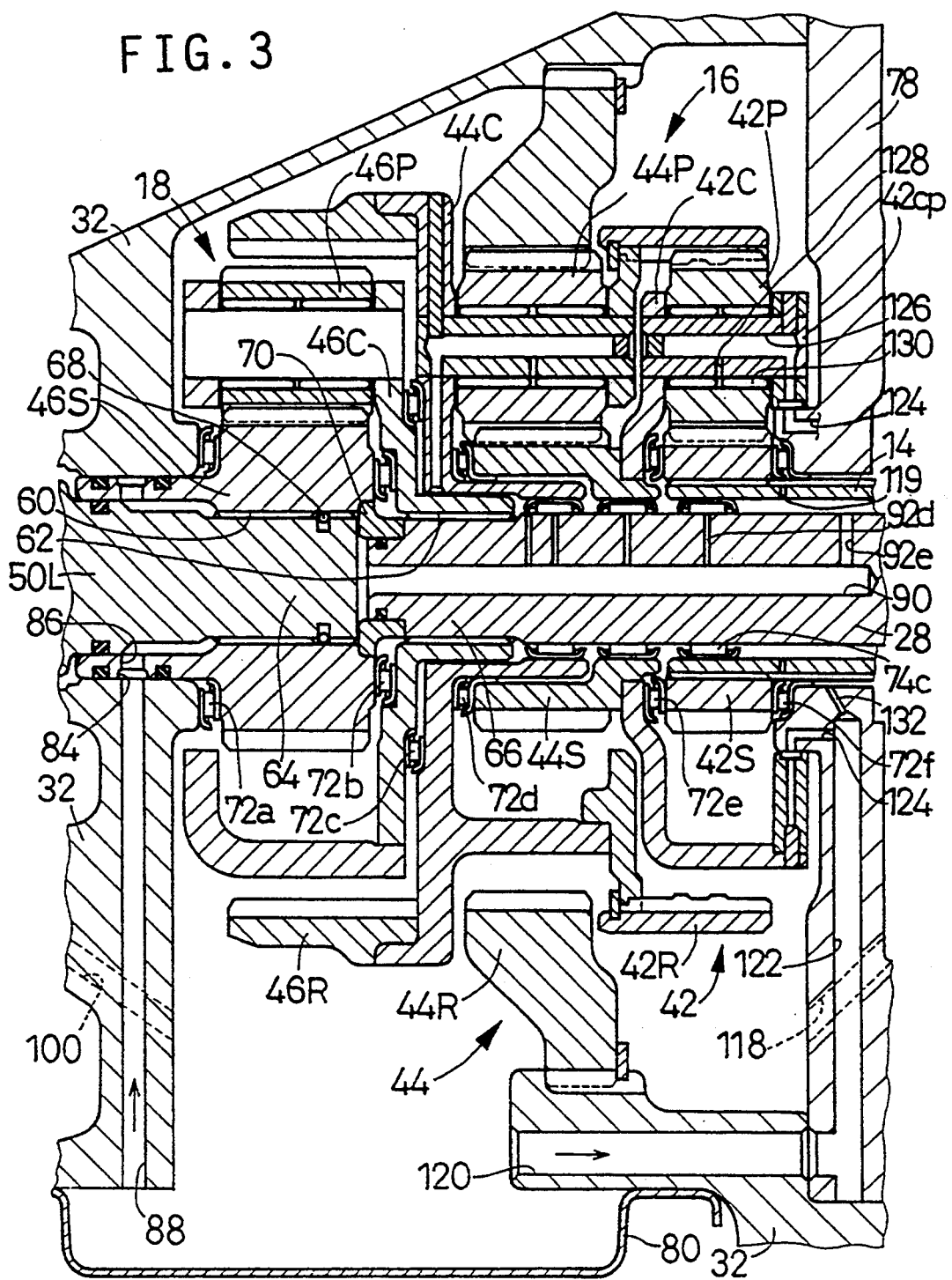
FIG. 3 is a fragmentary elevational view in cross sectional showing a speed reducing device and a differential gear device of the drive system of FIG. 1.
Figure 4:
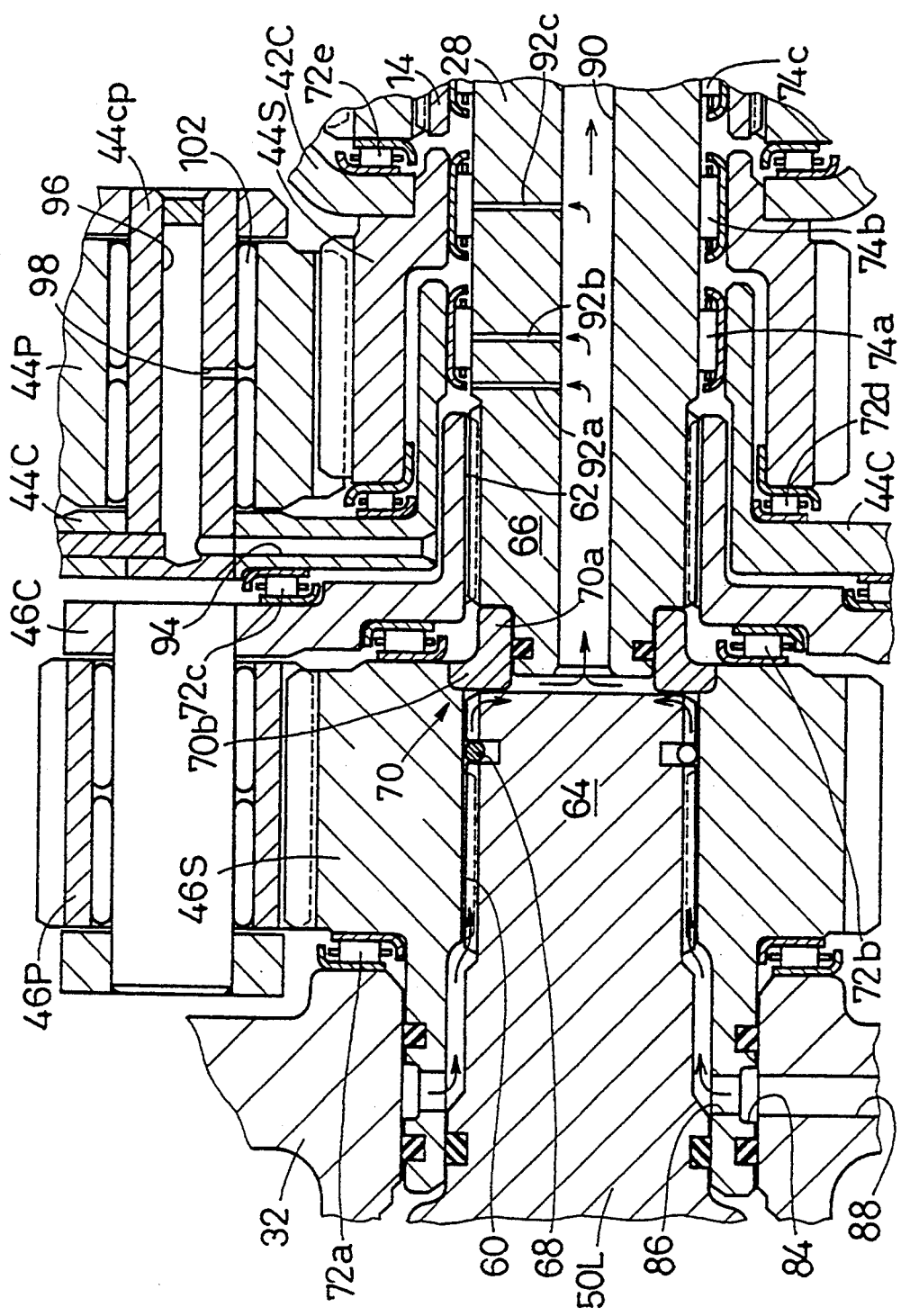
FIG. 4 is a fragmentary elevational view in cross section showing in enlargement a portion of the drive system of FIG. 3 which includes end portions of a first drive member and an intermediate shaft, and a stop member provided adjacent to these end portions.

Reference is now made to the cross sectional view of FIG. 3 showing in enlargement the components disposed within the first side housing 32, and to the cross sectional view of FIG. 4 showing in further enlargement the inner shaft portion of the left outer race 50L and the adjacent left end portion of the intermediate shaft 28. The individual rotary elements of the differential gear device 18 and speed reducing device 16 are positioned such that these elements are rotatable and axially immovable relative to stationary members such as the first side housing 32 and relative to other rotary members axially adjacent to those elements. Explained more specifically, a plurality of thrust bearings 72a through 72f are disposed at suitable positions between the rotary elements, and between these rotary elements and the first side housing 32 and a second intermediate housing 78, so that the thrust bearings 72a–72f appropriately position the rotary elements in the axial direction. For example, the first thrust bearing 72a is interposed between the first side housing 32 and the third carrier 46S, while the second thrust bearing 72b is interposed between the third sun gear 46S and the third carrier 46C, and the thrust bearing 72f is disposed in contact with the second intermediate housing 78. Further, needle bearings 74a, 74b and 74c are disposed between the intermediate shaft 28, and the second carrier 44C, second sun gear 44S and output shaft 14, respectively.

Figure 5:
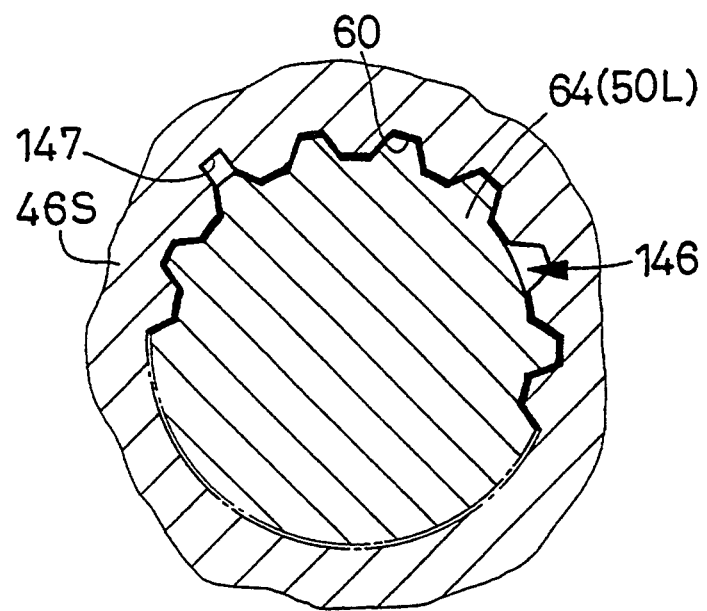
FIG. 5 is a transverse cross sectional view of the end portion of the first drive member of FIG. 4 which is splined to a sun gear of the speed reducing device of FIG. 3 and which cooperates with the sun gear to define an oil groove.

The third sun gear 46S and third carrier 46C of the differential gear device 18 have a first center bore 60 and a second center bore 62, respectively. The third sun gear 46S is splined at its first center bore 60 to a first end portion 64 of the shaft portion of the left outer race 50L, which end portion 64 is remote from the left drive wheel 26L. The third carrier 46C is splined at its second center bore 62 to a second end portion 66 of the intermediate shaft 28, which end portion 66 is remote from the right outer race 50R. Described more specifically, the inner surfaces of the first and second center bores 60, 62 are splined, and the outer circumferential surfaces of the first and second end portions 64, 66 are splined for engagement with the splined inner surfaces of the center bores 60, 62, respectively, as illustrated in FIG. 5 by way of example.

Between the first end portion 64 and the first center bore 60, there is inter]posed a retainer ring 68 for preventing the first end portion 64 of the outer race 50L from being pulled out of the first center bore 60 of the third sun gear 46S. To prevent the inner shaft portion of the right outer race 50R from being pulled out of the connecting sleeve 56, a similar retainer ring is disposed between these members 50R, 56.

The third sun gear 46S has a stop member 70 secured to the right end portion thereof such that the stop member 70 protrudes radially inwardly into the first center bore 60. This stop member 70 has a cylindrical portion 70a, and a radial flange portion 70b extending radially outwardly from the cylindrical portion 70a. The stop member 70 is welded to the third sun gear 46S, at the radially outer portion of the radial flange portion 70b. The cylindrical portion 70a is disposed between the right end face of the first end portion 64 of the outer race 50L, and a shoulder face of the second end portion of the intermediate shaft 28, which shoulder face is formed near the left end face of the second end portion 66 and faces the end face of the first end portion 64. Thus, the first and second end portions 64, 66 of the outer race 50L (first drive member) and the intermediate shaft 28 are abuttable on the axially opposite end faces of the cylindrical portion 70a of the stop member 70.

When a transverse thrust force is applied to the right outer race 50R (second drive member) in the inward or left direction toward the left outer race 50L (first drive member), the thrust force causes the second end portion 66 of the intermediate shaft 28 to abut on the cylindrical portion 70a of the stop member 70. As a result, the thrust force is transmitted from the stop member 70 to the first side housing 32, through the third sun gear 46S (to which the stop member 70 is fixed) and the thrust bearing 72a. Thus, the input thrust force is eventually received by the first side housing 32. When a transverse thrust force is applied to the left outer race 50L in the inward or right direction toward the right outer race 50R, the thrust force causes the first end portion 64 of the outer race 50L to abut on the cylindrical portion 70a of the stop member 70. Consequently, the thrust force is transmitted from the third sun gear 46S to the second intermediate housing 78, through the thrust bearing 72b, third carrier 46C, thrust bearing 72c, second carrier 44C, thrust bearing 72d, second sun gear 44S, first carrier 42C, thrust bearing 72e, first sun gear 42S and thrust bearing 72f. Thus, the input thrust force is eventually received by the second intermediate housing 78. This second intermediate housing 78 and the first intermediate housing 76 are secured to the connection of the cylindrical housing 30 and the first side housing 32. The housings 30, 32, 76 and 78 cooperate with the second side housing 34 to constitute the housing structure for the drive system 10. The first side housing 32 cooperates with the second intermediate housing 78 to define an enclosure in which the differential gear device 18 and the speed reducing device 16 are accommodated. The intermediate shaft 28 extends through the first and second intermediate housings 76, 78.

The outer races 50L, 50R may receive transverse thrust forces through the respective drive wheels 26L, 26R in the transversely inward directions of the vehicle, due to a transverse inertial force of the vehicle while the vehicle is turning a corner or running on a curved road, or due to collision of the vehicle with a sidewalk or pavement guard or a guard rail upon slipping of the vehicle on a road surface having a low friction coefficient. In this respect, it is noted that the stop member 70 and the thrust bearings 72a-72f are constructed to have strength values sufficient to withstand such transverse thrust forces applied to the vehicle.

At a lower portion of the first side housing 32, there is provided an oil pan 80 which stores a lubricant. To lubricate and cool the speed reducing device 16, differential gear device 18, electric motor 12 and other components of the drive system 10, the lubricant is pressurized by an oil pump 82 (FIG. 2) and circulated within the drive system 10, through oil passages formed through the housing structure and the appropriate components of the drive system 10. The circulated lubricant is returned to the oil reservoir 80.

Figures 6A, 6B:
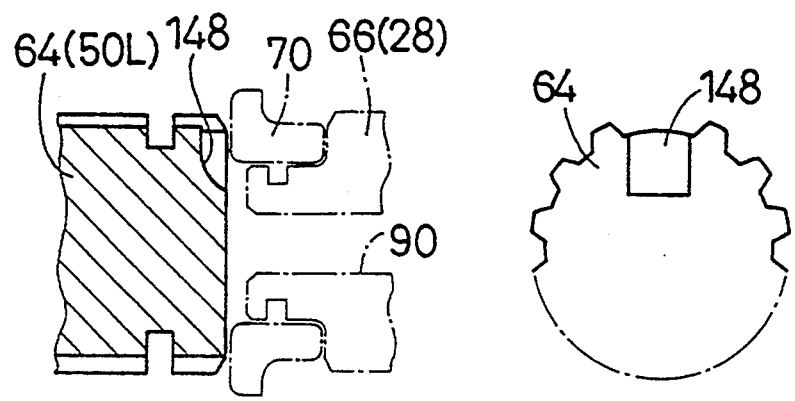
FIG. 6(a) is an elevational view in cross section showing a cutout formed in the end portion of the first drive member.
FIG. 6(b) is an elevational end view of the end portion of the first drive member.

As most clearly shown in FIG. 4, the third sun gear 46S has a cylindrical portion extending between an annular space between the left outer race 50L and the first side housing 32. This cylindrical portion of the third sun gear 46S has an annular groove 84 in its outer circumferential surface, and radial communication holes 86 formed therethrough in the radial direction. These holes 86 communicates with the annular groove 84. Annular sealing members are provided between the cylindrical portion of the third sun gear 46S and the outer race 50L and first side housing 32, to secure fluid tightness between these members. The first side housing 32 has an oil supply passage 88 communicating with the annular groove 84, so that the lubricant fed through the oil supply passage 88 is delivered through the radial communication holes 86 to the mutually engaging splined portions of the third sun gear 46S and first end portion 64 of the outer race 50L. These engaging splined portions have an axial oil passage 146 or 147 as shown in FIG. 5. The oil passage 146 is formed by cutting off one of the spline teeth of the first end portion 64, while the oil passage 147 is provided by forming an axial groove between adjacent spline teeth of the third sun gear 46S. To feed the lubricant from the splined portions of the sun gear 46S and end portion 64 of the outer race 50L to the radially inner portion of the stop member 70, the end portion 64 is provided with a cutout 148 at an extreme end thereof, as shown in FIGS. 6(a) and 6(b). The cutout 148 is aligned with the oil passage 146 or 147 in the circumferential direction of the end portion 64. The cylindrical portion 70a of the stop member 70 engages a small-diameter end of the second end portion 66 of the intermediate shaft 28. An annular sealing member is provided between the inner circumferential surface of the cylindrical portion 70a of the stop member 70 and the outer circumferential surface of the above-indicated small-diameter end of the intermediate shaft 28, to secure fluid tightness between the third sun gear 46S and the intermediate shaft 28.

The intermediate shaft 28 has an axial oil passage 90 formed along the center line of the second end portion 66. This passage 90 is open on the end face of the end portion 66. As shown in FIG. 3, the intermediate shaft 28 also have a plurality of radial oil passages 92a, 92b, 92c, 92d and 92e which communicate with the axial oil passage 90 and are open on the outer circumferential surface of the end portion 66, at selected axial positions. The lubricant fed from the engaging splined portions of the third sun gear 46S and the end portion 64 of the outer race 50L is delivered to the outer circumferential surface of the end portion 66 through the axial and radial oil passages 90 and 92a-92e. The radial oil passages 92a-92e have cross sectional areas suitably determined so as to deliver appropriate amounts of lubricant to the corresponding lubrication points. A portion of the lubricant delivered to the annular groove 84 and radial communication holes 86 through the oil supply passage 88 leaks through the above-indicated sealing members between the cylindrical portion of the third sun gear 46S and the first side housing 32, so that the thrust bearing 72a and the needle bearing 54 (FIG. 2) are lubricated. The lubricant delivered to the needle bearing 54 is returned to the oil reservoir 80 through a return passage 100 formed through the first side housing 32.

The lubricant fed from the oil passage 92a and the lubricant fed from the oil passage 92b and directed toward the oil passage 92a through the needle bearing 74a are partially fed through a radial oil passage 94 formed through the second carrier 44C, and delivered to an axial oil passage 96 formed through a radially central portion of the carrier pin 44cp. The lubricant is then fed from the axial oil passage 96 through radial oil passages 98 open on the outer circumferential surface of the carrier pin 44cp, whereby a needle bearing 102 is lubricated. The lubricant from the radial oil passages 92a and 92b is also fed to lubricate the thrust bearing 72c, and also fed through the mutually engaging splined portions of the intermediate shaft 28 and the third carrier 46C, and along the radially outer portion of the stop member 70, to lubricate the thrust bearing 72c and the various components of the differential gear device 18.

Figure 7:
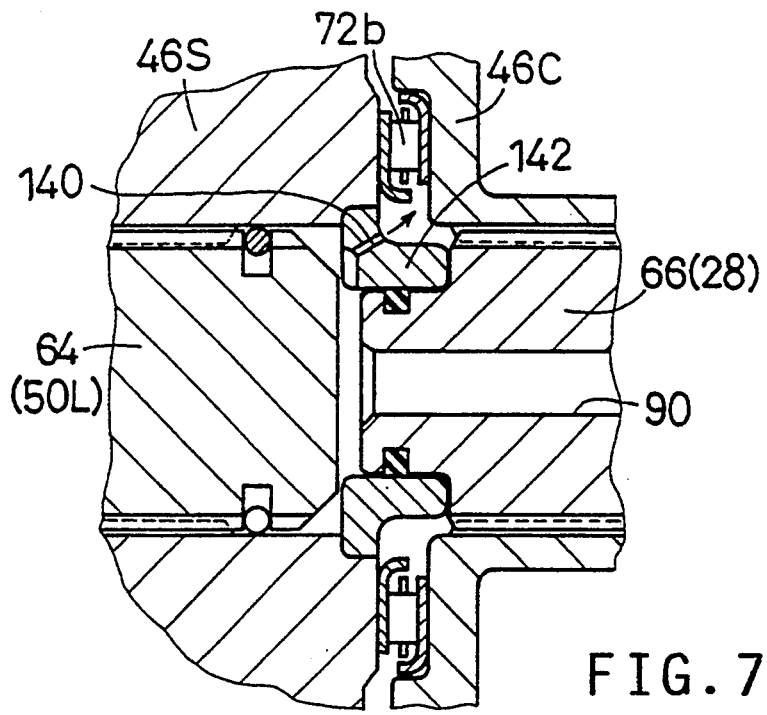
FIG. 7 is a fragmentary elevational view in cross section illustrating a stop member which is used, in place of the stop member of FIG. 4, in another embodiment of this invention.

In the present embodiment, the lubricant fed through the splined portions of the third sun gear 46S and the end portion 64 of the outer race 50L is directed into the axial oil passage 90, with the above-indicated sealing member provided to prevent leakage of the lubricant between the stop member 70 and the end portion 66 of the intermediate shaft 28. To effect more positive lubrication of the thrust bearing 72b and the components of the differential gear device 18, the stop member 70 may be replaced by a stop member 142 as shown in FIG. 7, which has a communication passage 140 formed therethrough for direct communication between the space defined by the opposite end faces of the first and second end portions 64, 66 and the space defined by the opposite end faces of the third sun gear 46S and the third carrier 46C. The communication passage 140 has a suitably determined cross sectional area.

The lubricant fed from the oil passage 92b through the needle bearing 74a toward the oil passage 92c and the lubricant fed from the oil passage 92c through the needle bearing 74b toward the oil passage 92b are directed to lubricate the thrust bearing 72d and then the components of the second planetary gear set 44 from the radially inner portion to the radially outer portion of the gear set 44. The lubricant fed from the oil passage 92c through the needle bearing 74b toward the oil passage 92d, and the lubricant fed from the oil passage 92d (FIG. 3) through the needle bearing 74c toward the oil passage 92c are directed to lubricate the thrust bearing 72e and then the components of the first planetary gear set 42 from the radially inner portion to the radially outer portion of the gear set 42.

The lubricant fed from the oil passage 92e and delivered between the intermediate shaft 28 and the output shaft 14 is mostly directed along the intermediate shaft 28 to the first right constant-velocity joint 20R, to an annular space between the ball bearing 38R and the roller bearing 58. The lubricant which has lubricated these components 38R, 58 is then fed through an oil passage 104 formed through the second side housing 34, and directed to a helical coolant passage 106 formed on the outer circumferential surface of the cylindrical housing 30, so that the heat generated by the electric motor 12 is absorbed by the lubricant flowing through the helical coolant passage 106. This coolant passage 106 is defined by a helical groove 108 formed in the outer circumferential surface of the cylindrical housing 30, and a cylindrical covering member 110 fitted on the cylindrical housing 30 so as to fluid tightly close the helical groove 108. The lubricant fed from the coolant passage 106 is returned to the oil pan 80 through a return passage 112 which is formed through the first and second intermediate housings 76, 78 and the first side housing 32.

The lubricant fed between the intermediate shaft 28 and the output shaft 14 is partially delivered through an oil passage 114 formed through the output shaft 14, to lubricate the ball bearing 38L, and is returned to the oil pan 80 through a return passage 116 formed through the first intermediate housing 76 and a return passage 118 (FIG. 3) formed through the second intermediate housing 78. The lubricant fed between the intermediate and output shafts 28, 14 is also directed through an oil passage 119 (FIG. 3) formed through the output shaft 14 to the outer circumference of the output shaft 14, to lubricate the thrust bearing 72f.

The lubricant pressurized by the oil pump 82 is also supplied to an oil supply passage 120 formed through a right lower portion of the first side housing 32 as shown in FIG. 3. The lubricant supplied to the supply passage 120 is delivered to the inside of the first carrier 42C through oil passages 122 and 124 formed through the second intermediate housing 78, and then fed into an axial oil passage 126 formed through the carrier pin 42cp of the second carrier 42C, and into radial oil passages 128 also formed through the carrier pin 42cp, whereby a needle bearing 130 is lubricated. The lubricant from the oil passage 122 is also fed into an oil passage 132 formed through the second side housing 78, as shown in FIG. 3. The lubricant fed from this oil passage 132 is directed to a space defined between the first and second intermediate housings 76, 78, to lubricate mutually engaging splined portions of a parking gear 134 (FIG. 2) and the output shaft 14. The lubricant fed to these splined portions is returned to the oil pan 80 through the return passage 118 indicated above. Within the above-indicated space between the first and second intermediate housings 76, 78, there are disposed a disk 136 and a sensor 138 for detecting the rotating speed of the output shaft 14.

In the electric motor vehicle drive system 10 constructed as described above, the third sun gear 46S and third carrier 46C which serve as the two output elements of the differential gear device 18 have the respective first and second center bores 60, 62 defined by the splined inner surfaces, while the outer race 50L and the intermediate shaft 28 have the respective first and second splined end portions 64, 66 which engage the splined inner surfaces of the first and second center bores 60, 62, respectively. Further, the stop member 70 is secured to the right end of the third sun gear 46S suck that the stop member 70 protrudes into the first center bore 60 of the sun gear 46S, so that the first and second end portions 64, 66 are abuttable at their end faces on the axially opposite end faces of the stop member 70, more precisely, on the axially opposite end faces of the cylindrical portion 70a of the stop member 70. In this arrangement, a transverse thrust force applied to the outer race 50L, 50R (intermediate shaft 28) in the transverse direction of the vehicle is transmitted to the stop member 70. The thrust force transmitted to the stop member 70 is then transmitted to and received by the first side housing 32 through the third sun gear 46S of the differential gear device 18 and the thrust bearing 72a, or alternatively transmitted to and received by the second intermediate housing 78 through the components of the differential gear device 18 and speed reducing device 16 and the thrust bearings 72b–72e, as described above in detail.

Figure 9:
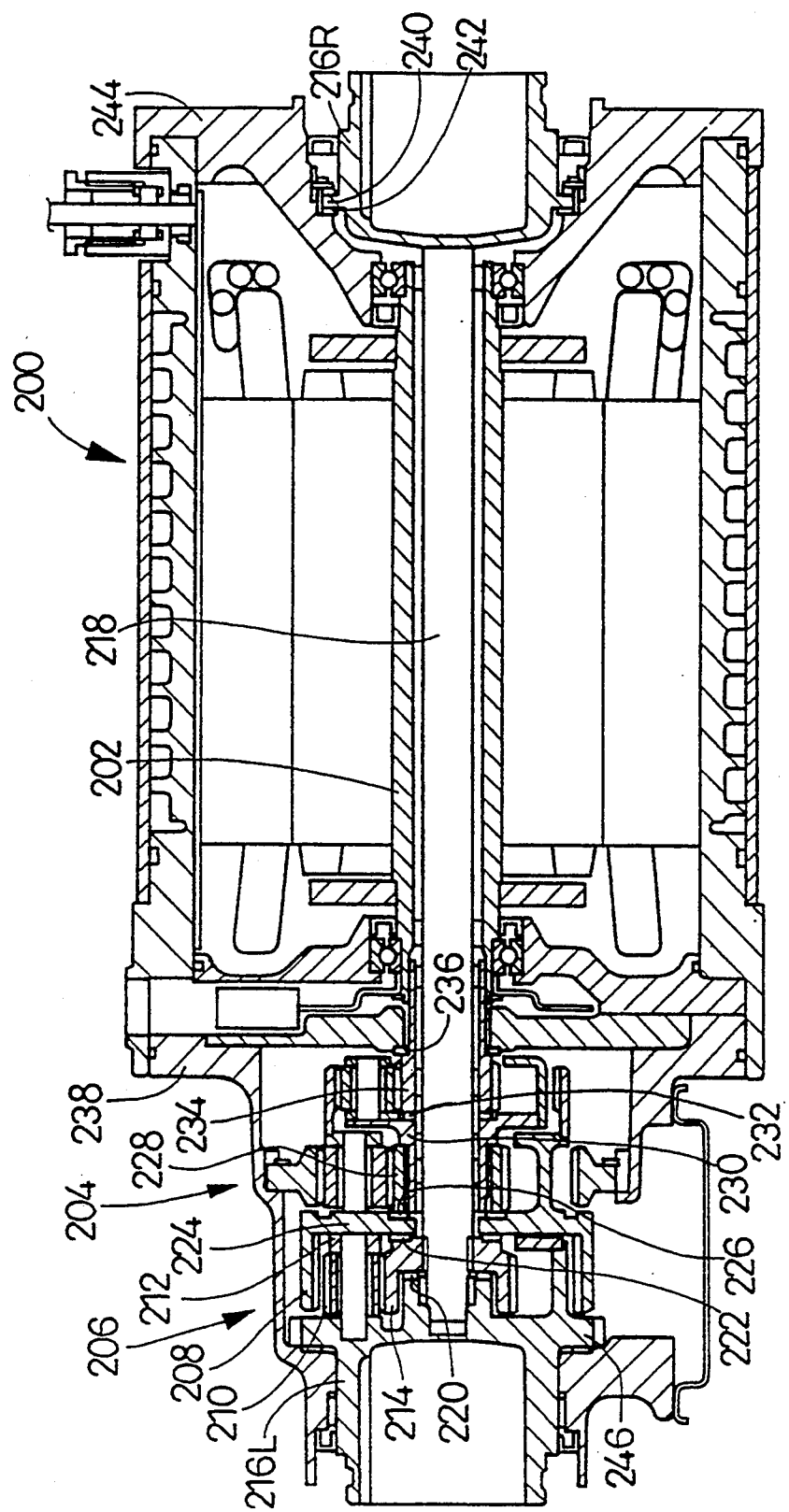
FIG. 9 is an elevational view in cross section of an example of an electric motor vehicle drive system against which the present invention provides an improvement.
Figure 10:
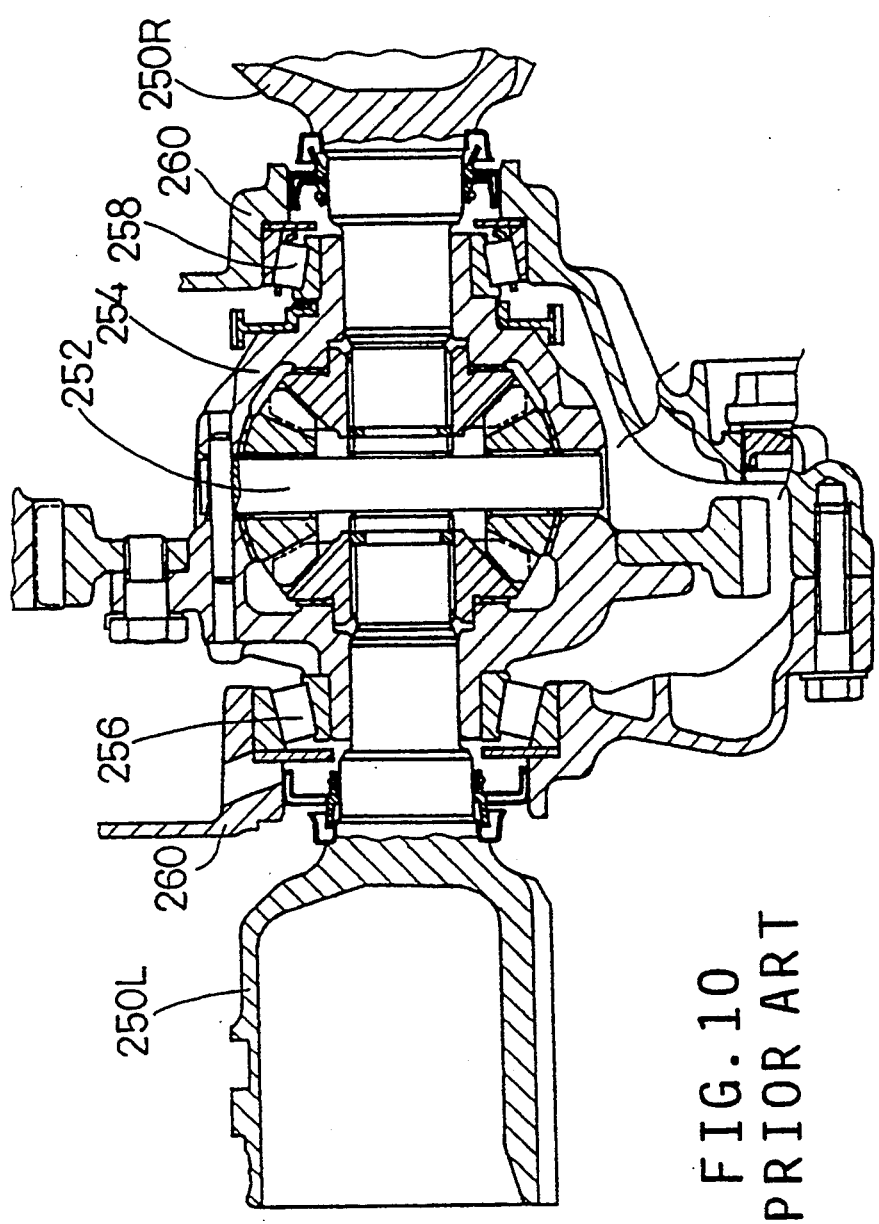
FIG. 10 is an elevational view in cross section of an example of a drive system of a bevel gear type commonly used on a conventional motor vehicle equipped with an internal combustion engine.

As explained above, the present drive system 10 is constructed such that the transverse thrust force applied to the outer race 50L or 50R is transmitted through the stop member 70 to the differential gear device 18 and speed reducing device 16 before the thrust force is finally received by the housing 32, 78. This arrangement is different from that of FIG. 9 in which the drive members (outer races) 216L, 216R are formed with the flanges 246, 240, and the large-diameter thrust bearings 236, 242 are provided to transmit the thrust force from the drive members 216L, 216R to the housings 238, 244. The elimination of such flanges and large-diameter thrust bearings in the present drive system 10 results in a considerably increase in the power transmitting efficiency of the drive system 10, and permits the use of the outer races 50L, 50R without flanges as the drive members, as in the drive system for the conventional gasoline-engine vehicle. The use of the non-flanged outer races 50L, 50R and the elimination of large-diameter thrust bearings are conducive to a significant decrease in the cost of manufacture of the drive system 10. Further, the non-flanged outer races 50L, 50R can be removed from the differential gear device 18, for some repairing purpose, even when the vehicle is in a loaded state.

In the present embodiment, the fluid tightness between the stop member 70 and the intermediate shaft 28 is maintained by a sealing member interposed therebetween. Accordingly, the lubricant fed through the mutually engaging splined portions of the third sun gear 46S and the outer race 50L can be introduced into the oil passage 90, without leakage between the stop member 70 and the intermediate shaft 28. The present arrangement using the stop member 70 and the sealing member permits: an increased amount of the lubricant to be delivered to the various components of the drive system 10 through the oil passage 90, and more effective lubrication of the components, as compared with an arrangement which does not use the stop member 70.

While the present invention has been described above by reference to FIGS. 1–7, it is to be understood that the invention may be otherwise embodied.

For instance, the stop member 70 of FIG. 4 or stop member 142 of FIG. 7 secured to the third sun gear 46S so as to protrude into the first center bore 60 may be replaced by a stop member 144 secured to the third carrier 46C so as to protrude into the second center bore 62. The stop member 144 has a cylindrical portion 144a disposed between the opposite end faces of the first and second end portions 64, 66, and a radial flange portion 144b at which the stop member 144 is secured to the third carrier 46C. In the present embodiment, a transverse thrust force applied to the right outer race 50R causes the second end portion 66 of the intermediate shaft 28 to abut on the stop member 144, and the thrust force is transmitted to the third carrier 46C to which the stop member 144 is secured. The thrust force is eventually transmitted to the first side housing 32 through the thrust bearing 72b, third sun gear 36S and thrust bearing 72a. On the other hand, a transverse thrust force applied to the left outer race 50L causes the first end portion 64 to abut on the stop member 144, and the thrust force is transmitted from the third carrier 46C to the second intermediate housing 78 through the thrust bearing 72c, second carrier 44C, thrust bearing 72d, second sun gear 44S, first carrier 42C, thrust bearing 72e, first sun gear 42S and thrust bearing 72f.

While the stop member 70, 142, 144 is secured by welding to the third sun gear 46S or third carrier 46C, the stop member may be formed as an integral part of the sun gear 46S or carrier 46C or secured thereto by calking, press-fitting or any other fixing means instead of welding.

In the illustrated embodiments, the outer race 50L (first end portion 64) is connected to the third sun gear 46S while the intermediate shaft 28 (second end portion 66) is connected to the third carrier 46C. However, a reverse connection of these members is possible. Namely, the outer race 50L and the intermediate shaft 38 may be connected to the third carrier 46C and the third sun gear 46S, respectively. In this case, the third carrier 46C has the center bore 62 engaging the end portion 64 of the outer race 50L, while the third sun gear 46S has the center bore 60 engaging the end portion 66 of the intermediate shaft 28.

Although the drive system 10 according to the illustrated embodiment includes the speed reducing device 16 of planetary gear type interposed between the electric motor 12 and the differential gear device 18, the electric motor 12 may be directly connected to the differential gear device 18. Further, the speed reducing device 16 may be replaced by another type of speed reducing device such as a variable transmission whose speed reduction ratio can be changed. The speed reducing device 16 may consist of a single planetary gear set.

In the illustrated embodiments, the outer race 50R is connected to the intermediate shaft 28 through the connecting sleeve 56 so that the outer race 50R is rotated with the intermediate shaft 28. However, the outer race 50R may be directly connected, or welded or otherwise fixed to the intermediate shaft 28.

The stop member 70, 142, 144 used in the illustrated embodiments is generally cylindrical and its cylindrical portion is disposed radially outwardly of the small-diameter end of the second end portion 66 of the intermediate shaft 28. However, the provision of such small-diameter end on the end portion 66 is not essential, and the stop member 70, 142, 144 may have any other shape such as a disk-like form.

Figure 8:
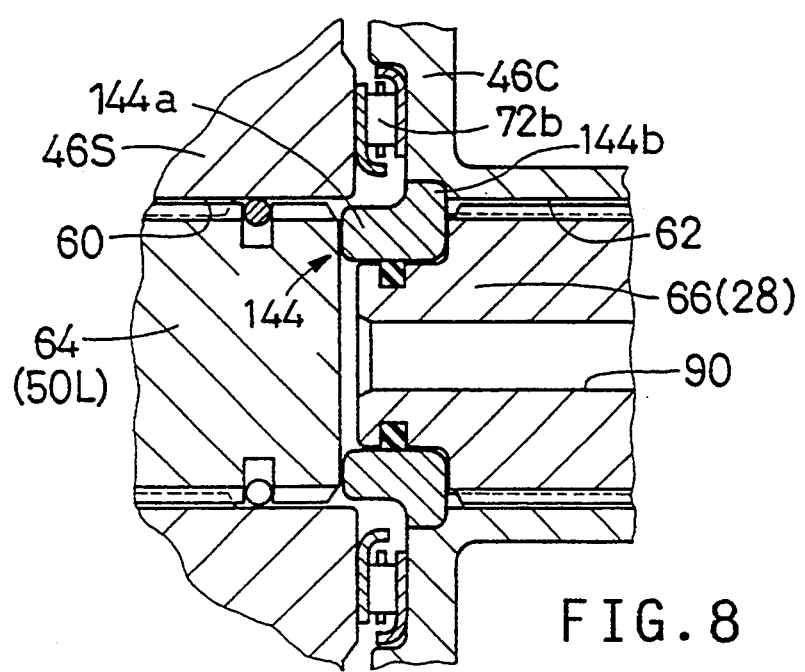
FIG. 8 is a fragmentary elevational view in cross section illustrating a stop member used in a further embodiment of the invention.

In the embodiment of FIG. 8, the stop member 144 abuttable on the end face of the first end portion 64 of the outer race 50L and is not associated with the third sun gear 46S. However, the stop member 144 may be modified so as to protrude into the center bore 60 of the third sun gear 46S so that a suitable sealing mender is disposed between the sun gear 46S and the stop member 144, in order to permit the lubricant from the supply passage 88 to flow into the oil passage 90 formed through the second end portion 66 of the intermediate shaft 28, as in the first embodiment of FIGS. 1–6.

While the mutually engaging splined portions of the first end portion 64 of the outer race 50L and the center bore 60 of the third sun gear 46S are provided with the single oil passage 146 or 147, those splined portions may be provided with two or more oil passages including the passage 146 and/or passage 147 and/or other types of grooves.

While the illustrated embodiments has a specific lubricating circuit with the oil passages as described above, the lubricating circuit may be modified as needed.

It is to be understood that the present invention may be embodied with various other changes, modifications and improvements, which may occur to those skilled in the art, in the light of the foregoing teachings, without departing from the spirit and scope of the invention defined in the following claims.

What is claimed is:

1. A drive system for an electric motor vehicle, having (a) a housing structure mounted on a chassis of the vehicle, (b) an electric motor disposed in said housing structure and having a hollow output shaft whose axis is parallel to a transverse direction of the vehicle, (c) a first and a second drive member which are supported by said housing structure, rotatably about respective axes coaxial with said output shaft, said drive members being operatively connected to a first and a second drive wheel, respectively, (d) an intermediate shaft disposed coaxially with said output shaft so as to extend through a center bore of said output shaft, and connected at one axial end thereof to said second drive member for rotation therewith, (e) a differential gear device of planetary gear type disposed in said housing structure coaxially and in series with said output shaft, said differential gear device including a sun gear, a ring gear, a carrier and a planetary gear, one of which serves as an input element that receives power transmitted from said electric motor, and the others of which include two output elements through which the power received by said input member are distributed to said first drive member and said intermediate shaft, and (f) a plurality of thrust bearings for positioning the elements of said differential gear device so as to inhibit movements of said elements in an axial direction of said output shaft, wherein the improvement comprises:

said first drive member including a first end portion having a splined outer circumferential surface remote from said first drive wheel;

said intermediate shaft including a second end portion having a splined outer circumferential surface remote from said second drive member;

said two output elements of said differential gear device having a first center bore and a second center bore, respectively, said first and second center bores being defined by respective splined inner surfaces which engage said splined outer circumferential surfaces of said first and second end portions, respectively; and a stop member provided on one of said two output elements, so as to protrude into at least one of said first and second center bores, such that opposed end faces of said first and second end portions are abuttable on opposite ends of said stop member, whereby a transverse thrust force applied to said first and second drive members in transversely inward direction of the vehicle is received by said stop member.

2. A drive system according to claim 1, wherein said stop member has a cylindrical portion interposed between said opposed, end faces of said first and second end portion, and a radial flange portion which extends radially outwardly from said cylindrical portion and which is fixed to said one of said two output members.

3. A drive system according to claim 1, wherein said stop member is fixed to said sun gear as said one of said two output elements.

4. A drive system according to claim 3, wherein said housing structure includes a side housing in which said differential gear device is disposed, and said plurality of thrust bearings includes a thrust bearing interposed between said side housing and said sun gear, said transverse thrust force applied to said second drive member being transmitted to and received by said side housing through said intermediate shaft, said stop member, said sun gear and said thrust bearing interposed between said side housing and said sun gear.

5. A drive system according to claim 4, wherein said housing structure includes an intermediate housing which cooperates with said side housing to define an enclosure in which said differential gear device is accommodated, said intermediate shaft extending through said intermediate housing, said plurality of thrust bearings including a thrust bearing disposed in contact with said intermediate housing, said transverse thrust force applied to said first drive member being transmitted to and received by said intermediate housing through said stop member and said sun gear, and through at least said thrust bearing disposed in contact with said intermediate housing.

6. A drive system according to claim 1, wherein said stop member is fixed to said carrier as said one of said two output members.

7. A drive system according to claim 6, wherein said housing structure includes a side housing in which said differential gear device is disposed, and said plurality of thrust bearings includes a first thrust bearing interposed between said side housing and said sun gear, and a second thrust bearing interposed between said sun gear and said carrier, said transverse thrust force applied to said second drive member being transmitted to and received by said side housing through said intermediate shaft, said stop member, said carrier, said second thrust bearing, said sun gear and said first thrust bearing.

8. A drive system according to claim 7, wherein said housing structure includes an intermediate housing which cooperates with said side housing to define an enclosure in which said differential gear device is accommodated, said intermediate shaft extending through said intermediate housing, said plurality of thrust bearings including a third thrust bearing disposed in contact with said intermediate housing, said transverse thrust force applied to said first drive mender being transmitted to and received by said intermediate housing through said stop member and said carrier, and through at least said third thrust bearing disposed in contact with said intermediate housing.

9. A drive system according to claim 1, wherein said input element consists of said ring gear.

10. A drive system according to claim 1, further comprising a speed reducing device disposed between said output shaft of said electric motor and said differential gear device.

11. A drive system according to claim 10, wherein said speed reducing device is of a planetary gear type.

12. A drive system according to claim 11, wherein said speed reducing device of planetary gear type consists of two planetary gear sets.

13. A drive system according to claim 12, wherein said input element of said differential gear device is connected to a carrier of one of said two planetary gear sets which is remote from said output shaft.

14. A drive system according to claim 1, wherein said splined outer circumferential surface of said first end portion of said first drive member and said splined inner surface of said first bore of one of said two output members cooperate with each other to define at least one oil passage through which a lubricant is fed.

15. A drive system according to claim 14, wherein said second end portion of said intermediate shaft has an axial oil passage formed in an axial direction thereof, and a plurality of radial oil passages which communicate with said axial oil passage and which are open in the outer circumferential surface of said second end portion, so that said lubricant which has been fed through said at least one oil passage of said first end portion and said first center bore is delivered to lubricating points radially outward of the outer circumferential surface of said second end portion of said intermediate shaft, through said axial oil passage and said radial oil passages.

16. A drive system according to claim 15, wherein said stop member has a communication passage formed therethrough so that the lubricant which has been fed through said at least one oil passage of said first end portion and said first center bore is also delivered to lubrication points radially outward of said stop member through said communication passage.

17. A drive system according to claim 15, further comprising a sealing member interposed between said stop member and said second end portion of said intermediate shaft, to maintain fluid tightness therebetween for a sufficient a flow of the lubricant into said axial oil passage (90) formed through said second end portion.

* * * * *

UNITED STATES PATENT AND TRADEMARK OFFICE
CERTIFICATE OF CORRECTION

PATENT NO. : 5,443,130
DATED : August 22, 1995
INVENTOR(S) : Koichi TANAKA, et al.

It is certified that error appears in the above-indentified patent and that said Letters Patent is hereby corrected as shown below:

Column 1, line 63, change "sung" to --sun--.

Column 3, line 32, change "are" to --is--.

Column 4, line 12, change "require" to --requires--.

Column 4, line 13, delete "and" at end of line.

Column 4, line 18, change "considerably" to --considerable--.

Column 4, line 60, change "mender" to --member--.

Column 5, line 16, change "sectional" to --section--.

Column 5, line 65, change "joint 201, a a left" to --joint 201, a left--.

Column 6, line 15, change "joint" to --joints--.

Column 6, line 23, change "an" to --a--.

Column 6, line 26, change "position" to --positioned--.

Column 8, line 24, change "interjposed" to --interposed--.

UNITED STATES PATENT AND TRADEMARK OFFICE
CERTIFICATE OF CORRECTION

PATENT NO. : 5,443,130
DATED : August 22, 1995
INVENTOR(S) : Koichi TANAKA, et al.

It is certified that error appears in the above-indentified patent and that said Letters Patent is hereby corrected as shown below:

Column 9, line 45, change "communicates" to --communicate--.

Column 10, line 13, change "have" to --has--.

Column 10, line 63, delete the colon after "space".

Column 12, line 16, change "suck" to --such--.

Column 12, line 48, change "considerably" to --considerable--.

Column 14, line 10, before "abuttable" insert --is--.

Column 14, line 14, change "mender" to --member--.

Column 14, line 27, change "has" to --have--.

Column 14, line 60, delete "member are" and insert --element is--.

UNITED STATES PATENT AND TRADEMARK OFFICE
CERTIFICATE OF CORRECTION

PATENT NO. : 5,443,130
DATED : August 22, 1995
INVENTOR(S) : Koichi TANAKA, et al.

It is certified that error appears in the above-indentified patent and that said Letters Patent is hereby corrected as shown below:

Column 16, line 11, change "mender" to --member--.

Column 16, line 62, delete "(90)".

Signed and Sealed this

Twenty-seventh Day of February, 1996

Attest:

BRUCE LEHMAN

Attesting Officer

Commissioner of Patents and Trademarks